US008786909B2

(12) United States Patent
Hama (10) Patent No.: US 8,786,909 B2
(45) Date of Patent: Jul. 22, 2014

(54) COMMUNICATION APPARATUS THAT SELECTIVELY USES CODECS, METHOD OF CONTROLLING THE COMMUNICATION APPARATUS, AND STORAGE MEDIUM

(75) Inventor: Mikio Hama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 56 days.

(21) Appl. No.: 13/586,478

(22) Filed: Aug. 15, 2012

(65) Prior Publication Data

US 2013/0050769 A1 Feb. 28, 2013

(30) Foreign Application Priority Data

Aug. 25, 2011 (JP) .................................. 2011-183865

(51) Int. Cl.
| | | |
|---|---|---|
| *H04N 1/32* | (2006.01) | |
| *G06F 15/16* | (2006.01) | |
| *G06K 9/54* | (2006.01) | |
| *H04L 12/16* | (2006.01) | |
| *H04L 12/28* | (2006.01) | |
| *H04N 7/12* | (2006.01) | |

(52) U.S. Cl.
USPC ...... 358/426.08; 370/260; 370/389; 709/247; 382/307; 375/240.12

(58) Field of Classification Search
USPC ............ 358/1.15, 426.08; 370/260, 389, 266, 370/324; 709/247; 382/307; 375/240.12; 700/2
See application file for complete search history.

(56) References Cited

U.S. PATENT DOCUMENTS

| | | | | |
|---|---|---|---|---|
| 4,507,781 | A * | 3/1985 | Alvarez et al. ................ | 370/266 |
| 6,292,840 | B1 * | 9/2001 | Blomfield-Brown et al. .............................. | 709/247 |
| 6,587,735 | B1 * | 7/2003 | Yaguchi ........................... | 700/2 |
| 8,126,295 | B2 * | 2/2012 | Lee et al. ....................... | 382/307 |
| 2007/0291841 | A1 * | 12/2007 | Muraki et al. ........... | 375/240.12 |
| 2009/0080423 | A1 * | 3/2009 | Ewing ........................... | 370/389 |
| 2010/0097960 | A1 * | 4/2010 | Amano ........................ | 370/260 |

FOREIGN PATENT DOCUMENTS

JP 2003-092671 A 3/2003

* cited by examiner

*Primary Examiner* — Charlotte M Baker
*Assistant Examiner* — Rury Grisham
(74) *Attorney, Agent, or Firm* — Rossi Kimms & McDowell LLP

(57) ABSTRACT

A communication apparatus which is capable of selectively using codecs appropriately. The communication apparatus is provided with a software codec configured to encode and decode images and a hardware codec configured to encode and decode images at higher speed than the software codec. In facsimile communication with an IP-FAX machine connected to an IP network, the communication apparatus causes the hardware codec to encode or decode an image. In facsimile communication with an analog facsimile machine connected to an analog network, the communication apparatus causes the software codec to encode or decode the image.

11 Claims, 9 Drawing Sheets

FIG.5
HARDWARE CODEC USE/NON-USE SELECTION SCREEN 5001

LOCAL AREA IP-FAX COMMUNICATION

DO YOU USE HARDWARE CODEC?

5002  5003

| NON-USE | USE |

FIG.6
THRESHOLD VALUE SETTING SCREEN 6001

IP-FAX COMMUNICATION SPEED SETTING

6002

| 100kbps |

COMMUNICATION APPARATUS THAT SELECTIVELY USES CODECS, METHOD OF CONTROLLING THE COMMUNICATION APPARATUS, AND STORAGE MEDIUM

BACKGROUND OF THE INVENTION

1. Field of the Invention

The present invention relates to a communication apparatus and a method of controlling the same, as well as a storage medium, and more particularly to a communication apparatus that selectively uses codecs, a method of controlling the communication apparatus, and a storage medium.

2. Description of the Related Art

In recent years, attention has been being given to IP-FAX which transmits and receives FAX using an IP network. The IP-FAX is also mentioned as one of services provided by the NGN network which is the public IP network of NTT (registered trademark).

As is apparent from the fact that communication speed of the NGN network is one Mbps maximum, IP-FAX communication speed is high, so that it is possible to transmit or receive an image in shorter time than in facsimile communication using a conventional analog line.

Further, it is expected that the IP-FAX will be used for high-resolution facsimile transmission/reception and color facsimile transmission/reception in which the amount of data to be transmitted is large, by making the most of the high-speed transmission capability of the IP-FAX.

Further, since the IP network is used, it is possible to easily increase the number of simultaneous communications without adding a telephone line or modem hardware which is necessary for the conventional analog network, so that multi-session is enabled.

Note that the conventional analog facsimile machine can be also connected to a public IP network via a T.38 gateway (GW). Although detailed description is omitted because the technique is conventionally known, IP-FAX machines establish call connection therebetween using SIP (Session Initiation Protocol) and perform data communication using the T.38 protocol.

In conjunction with this, a T.38 gateway converts the SIP call connection to an analog telephone call connection and the T.38 protocol to the T.30 protocol on a real-time basis, to thereby enable communication between an IP-FAX machine and an analog facsimile machine (see e.g. Japanese Patent Laid-Open Publication NO. 2003-92671).

In a case where an IP-FAX machine communicates with an analog facsimile machine via a T.38 gateway, the communication speed of the IP-FAX machine cannot be increased to a speed higher than 14400 bps set as the maximum communication speed of a V.17 analog facsimile machine.

The communication between conventional analog facsimile machines is performed at a low communication speed as mentioned above, so that a software codec suffices to perform image encoding and decoding.

The NGN network guarantees a bandwith of 1 Mbps at maximum, but e.g. in a case where encoding and decoding is performed using the software codec, the processing speed is too slow to make the most of the performance of the public IP network.

Further, since the NGN network employs time-based charging, slower communication speed forces users to pay more money.

For this reason, it is desirable to use a hardware codec for image coding and decoding. However, it is disadvantageous in terms of costs to equip an IP-FAX machine with dedicated hardware codecs corresponding in number to communication lines for multi-session. Therefore, hardware codecs cannot be used for all communications.

On the other hand, in a case where an IP-FAX machine communicates with an analog facsimile machine via a T.38 gateway, as mentioned hereinabove, communication speed cannot exceed the maximum communication speed of 14400 bps of the analog facsimile machine, so that a software codec suffices to process data.

Further, even in communication between IP-FAX machines, when not the public IP network but a local IP network is used, no charge is imposed on the communication even if the communication takes some long time. Therefore, even if the communication speed is reduced to some extent due to the use of a software codec, there is no fear that the communication charge will increase.

SUMMARY OF THE INVENTION

The present invention provides a communication apparatus capable of selectively using codecs appropriately, a method of controlling the communication apparatus, and a storage medium.

In a first aspect of the present invention, there is provided a communication apparatus comprising a first codec unit configured to encode and decode images, a second codec unit configured to encode and decode images at higher speed than said first codec unit, and a control unit configured to cause said second codec unit to encode or decode an image during facsimile communication with a facsimile machine connected to an IP network, and cause said first codec unit to encode or decode the image during facsimile communication with a facsimile machine connected to an analog network.

In a second aspect of the present invention, there is provided a method of controlling a communication apparatus including a first codec unit configured to encode and decode images and a second codec unit configured to encode and decode images at higher speed than said first codec unit, comprising causing the second codec unit to encode or decode an image during facsimile communication with a facsimile machine connected to an IP network, and causing the first codec unit to encode or decode the image during facsimile communication with a facsimile machine connected to an analog network.

In a third aspect of the present invention, there is provided a non-transitory computer-readable storage medium storing a computer-executable program for causing a computer to execute a method of controlling a communication apparatus including a first codec unit configured to encode and decode images and a second codec unit configured to encode and decode images at higher speed than said first codec unit, wherein the method comprises causing the second codec unit to encode or decode an image during facsimile communication with a facsimile machine connected to an IP network, and causing the first codec unit to encode or decode the image during facsimile communication with a facsimile machine connected to an analog network.

According to the present invention, it is possible to selectively use the codecs appropriately.

Further features of the present invention will become apparent from the following description of exemplary embodiments with reference to the attached drawings.

DESCRIPTION OF THE EMBODIMENTS

The present invention will now be described in detail below with reference to the accompanying drawings showing an embodiment thereof.

Figure 1:
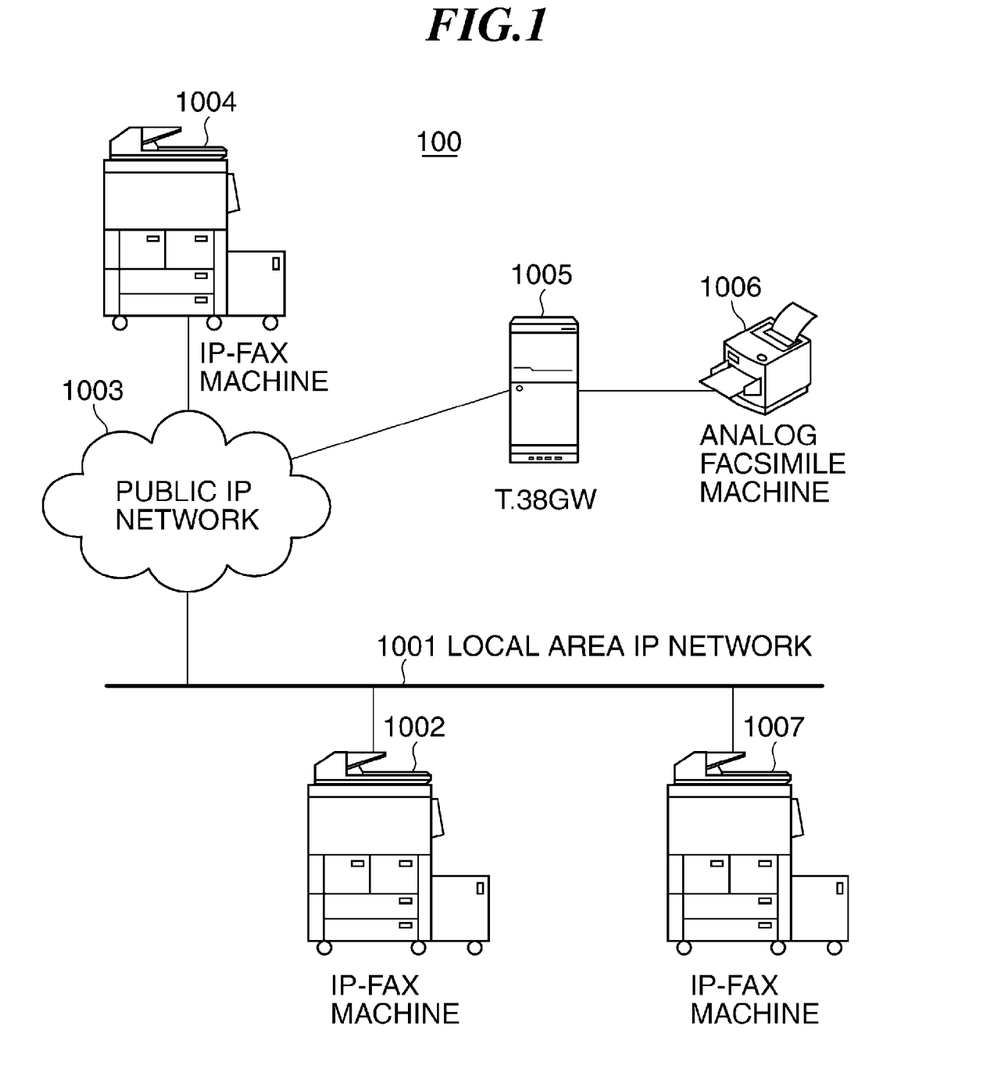
FIG. 1 is a schematic diagram of a communication system including a communication apparatus according to an embodiment of the present invention.

FIG. 1 is a schematic diagram of a communication system 100 including a communication apparatus according to an embodiment of the present invention.

As shown in FIG. 1, the communication system 100 comprises a local area IP network 1001, a public IP network 1003, IP-FAX machines 1002, 1004, and 1007, a T.38 gateway (GW) 1005, and an analog facsimile machine 1006.

Each of the IP-FAX machines 1002, 1004, and 1007 corresponds to the communication apparatus of the present invention. In the present embodiment, the following description is basically given of the IP-FAX machine 1002. The IP-FAX machine 1004 is connected to the public IP network 1003, and the IP-FAX machine 1007 is connected to the local area IP network 1001.

Note that strictly speaking, the communication system 100 needs a gateway for connection to the public IP network 1003, a gateway for connection to the local area IP network 1001, a SIP server for managing session connection, etc., but illustration and description thereof are omitted here. Further, when a description common to the IP-FAX machines 1002, 1004, and 1007 is given, the IP-FAX machines 1002, 1004, and 1007 will be simply referred to as "the IP-FAX machine".

In FIG. 1, the communication speed is different between a line using the public IP network 1003 and a line including an analog network between the T.38 gateway and the analog facsimile machine 1006.

Figure 2:
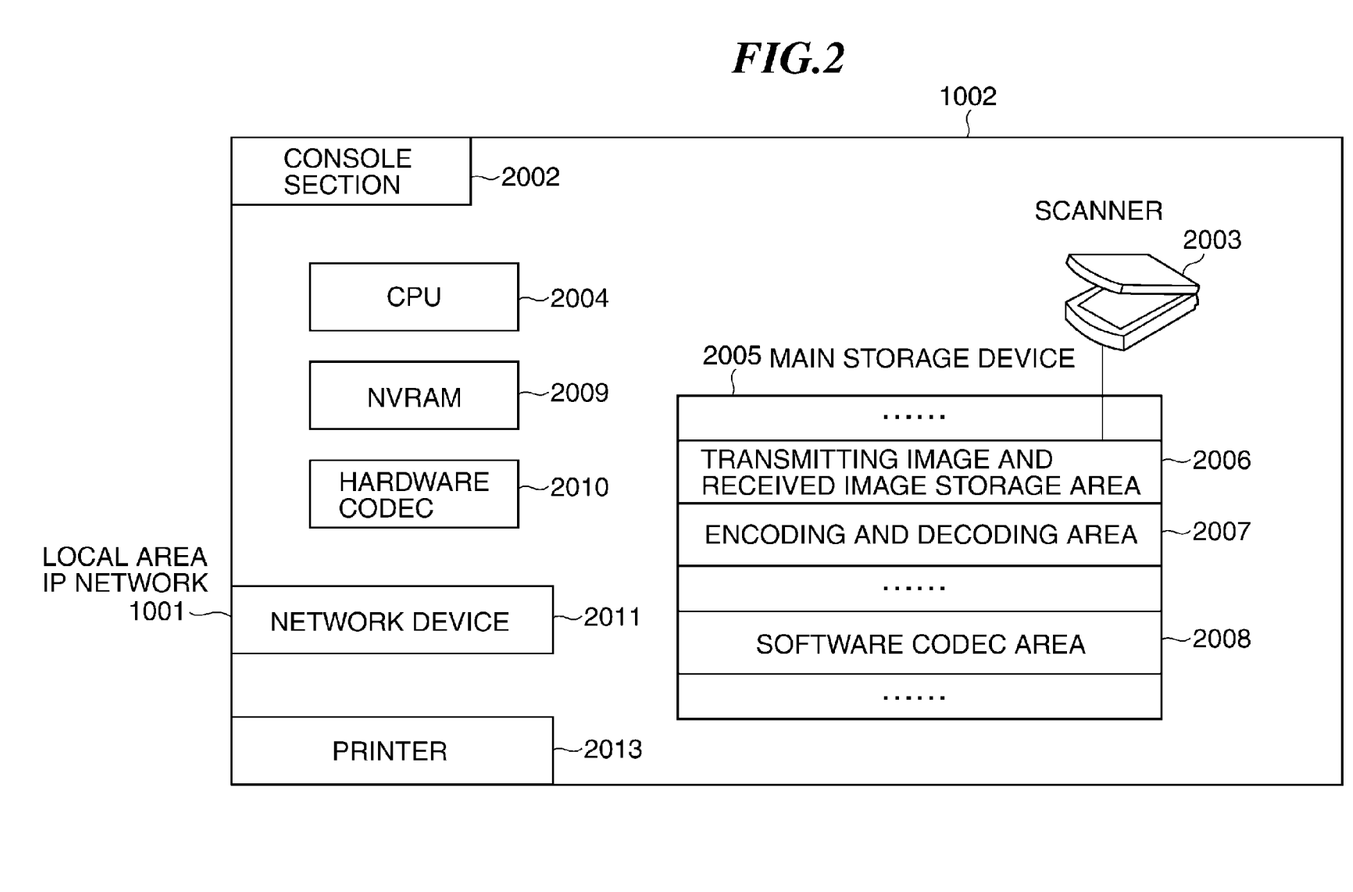
FIG. 2 is a block diagram of an IP-FAX machine appearing in FIG. 1.

FIG. 2 is a block diagram of the IP-FAX machine 1002 appearing in FIG. 1.

Referring to FIG. 2, the IP-FAX machine 1002 includes a console section 2002, a scanner 2003, a CPU 2004, a main storage device 2005, and an NVRAM 2009. Further, the IP-FAX machine 1002 includes a hardware codec 2010, a network device 2011, and a printer 2013.

The CPU 2004 is a computing device, and controls the overall operation of the IP-FAX machine 1002.

The console section 2002 comprises a keyboard, a display section, and so forth, and is provided for enabling an operator to carry out various input operations. The scanner 2003 reads an image to be transmitted. The printer 2013 prints a received image.

The NVRAM (NonVolatile RAM) 2009 stores user settings and the like. The hardware codec 2010 performs encoding and decoding.

The main storage device 2005 is used for storing programs operated by the CPU 2004 and image data. The main storage device 2005 includes a transmitting image and received image storage area 2006, an encoding and decoding area 2007, and a software codec area 2008. The software codec area 2008 stores a program for executing a software codec. The program is executed by the CPU 2004, whereby it is possible to realize the software codec function.

The transmitting image and received image storage area 2006 is an area for temporarily storing a transmitting image read by the scanner 2003 or temporarily storing a received image.

The encoding and decoding area 2007 is an area for temporarily storing data encoded or decoded by the software codec stored in the software codec area 2008 or the hardware codec 2010.

The software codec area 2008 is an area for storing the software codec program read and operated by the CPU 2004.

The network device 2011 is used to connect the IP-FAX machine 1002 to the network. The network device 2011 performs IP data transmission and reception. The network device 2011 is also capable of transmitting and receiving FAX data to and from the analog facsimile machine 1006 connected to the analog network. Thus, the network device 2011 can transmit and receive images using lines different in communication speed.

In the present embodiment, the software codec corresponds to a first codec unit configured to encode an image to be transmitted by FAX and decode an image received by FAX. On the other hand, the hardware codec 2010 corresponds to a second codec unit configured to perform the image encoding or decoding at a higher speed than the first codec unit.

Note that a codec which performs encoding and decoding at a low speed is not limited to a software codec. For example, an IP-FAX machine can be equipped with two or more hardware codecs different in encoding speed and decoding speed.

The other IP-FAX machines 1004 and 1007 are identical in configuration to the IP-FAX machine 1002.

Figure 3:
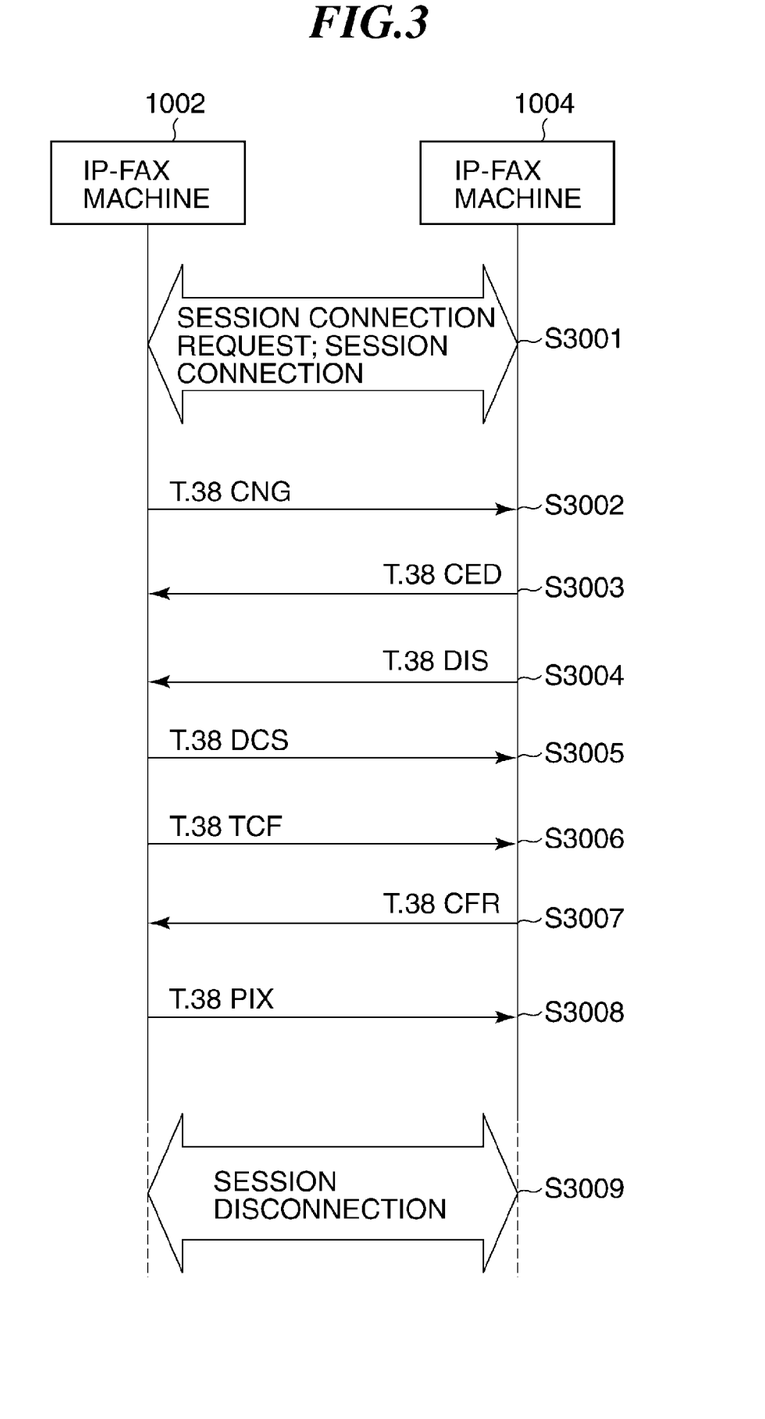
FIG. 3 is a sequence diagram of facsimile communication performed between IP-FAX machines appearing in FIG. 1.

FIG. 3 is a sequence diagram of a facsimile communication performed between the IP-FAX machines appearing in FIG. 1.

This sequence diagram illustrates a facsimile communication performed between the IP-FAX machines 1002 and 1004 or the IP-FAX machines 1002 and 1007 in FIG. 1.

In the FIG. 3 example, it is assumed that the facsimile communication is performed between the IP-FAX machine 1002 as a transmitter and the IP-FAX machine 1004 as a receiver.

Referring to FIG. 3, the IP-FAX machine 1002 sends a session (call) connection request to the IP-FAX machine 1004 to make a session connection (step S3001). Strictly speaking, a gateway is necessitated for connection from the local area IP network 1001 to the public IP network 1003. Further, in order to make the session connection, it is required to perform control e.g. using SIP. However, these techniques are known, and therefore description thereof is omitted.

When a session is established by the session connection, the IP-FAX machine 1002 sends a T.38 CNG (Calling signal) to the IP-FAX machine 1004 (step S3002).

Then, the IP-FAX machine 1004 transmits a T.38 CED (Called Station ID) (step S3003). The receiving-side IP-FAX machine 1004 declares capabilities by a T.38 DIS (Digital Identification Signal), and the IP-FAX machine 1002 receives the T.38 DIS (step S3004).

The transmitting-side IP-FAX machine 1002 sends back a capability declaration by a T.38 DCS (Digital Command Signal), and the IP-FAX machine 1004 receives the capability declaration (step S3005). In general, according to Recommendation T.30, whether or not an opposite communication party is an analog facsimile machine connected to a T.38 gateway can be determined by analyzing the bit 3 and bit 121 of the received DIS or DCS.

In the present case, both the IP-FAX machines 1004 and 1002 understand by analysis of the DIS and DCS that the other parties are IP-FAX machines connected without via a T.38 gateway, respectively.

Then, the IP-FAX machine 1002 sends a T.38 TCF to the IP-FAX machine 1004 and the IP-FAX machine 1004 receives the T.38 TCF (Training Check Field) (step S3006), and the IP-FAX machine 1004 sends a T.38 CFR (Confirmation to Receive) to the IP-FAX machine 1002 and the IP-FAX machine 1002 receives the T.38 CFR (step S3007), whereafter image communication is performed (step S3008). The image transmission and reception is also performed using a known technique, and therefore detailed description thereof is omitted here. After completion of the image transmission and reception, the session is disconnected (step S3009) and the present process is terminated.

Figure 4:
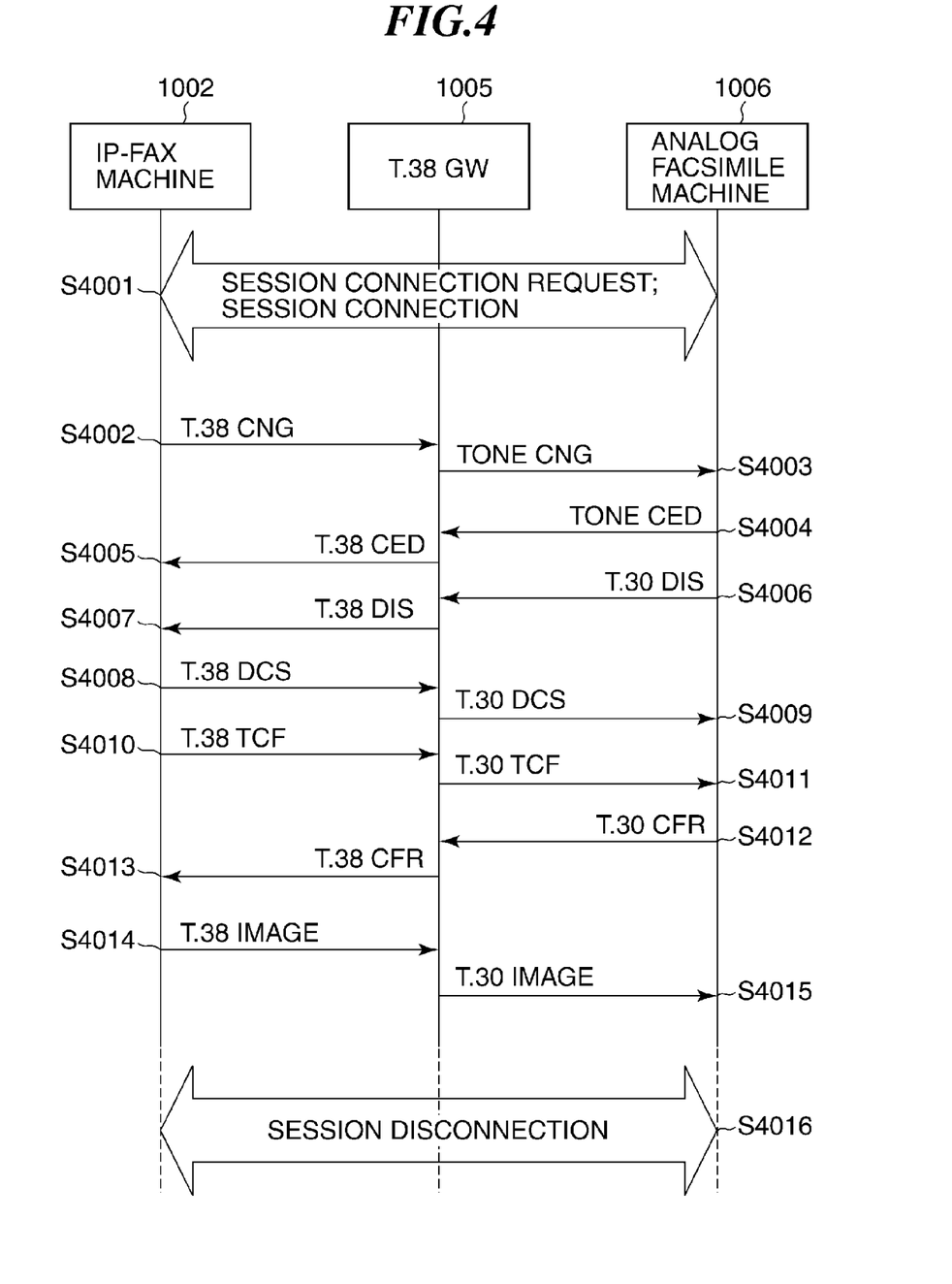
FIG. 4 is a sequence diagram of facsimile communication performed between an IP-FAX machine appearing in FIG. 1 and an analog facsimile machine connected to a T.38 gateway.

FIG. 4 is a sequence diagram of facsimile communication performed between an IP-FAX machine appearing in FIG. 1 and the analog facsimile machine 1006 connected to the T.38 gateway 1005.

The present sequence diagram illustrates a facsimile communication performed between the IP-FAX machine 1002 and the analog facsimile machine 1006 in FIG. 1.

Referring to FIG. 4, the IP-FAX machine 1002 sends a session (call) connection request to the analog facsimile machine 1006 to make a session connection (step S4001). The T.38 gateway 1005 converts the IP-FAX session connection request received from the IP-FAX machine 1002 to an analog session connection request, and sends the analog session connection request to the analog facsimile machine 1006. Specifically, a SIP INVITE signal is converted to a dial request for analog call connection, for example.

When a session is established by the session connection, the IP-FAX machine 1002 sends a T.38 CNG to the T.38 gateway 1005 (step S4002). The T.38 CNG is converted to a TONE CNG which is analog tone by the T.38 gateway 1005, and the TONE CNG is sent to the analog facsimile machine 1006 (step S4003).

The analog facsimile machine 1006 sends a TONE CED which is analog tone to the T.38 gateway 1005 (step S4004). The TONE CED is converted to a T.38 CED by the T.38 gateway 1005, and the T.38 CED is sent to the IP-FAX machine 1002 (step S4005).

Then, the analog facsimile machine 1006 sends a T.30 DIS to the T.38 gateway 1005 (step S4006), and the T.38 gateway 1005 converts the T.30 DIS to a T.38 DIS and sends the T.38 DIS to the IP-FAX machine 1002 (step S4007). In the present example, the IP-FAX machine 1002 analyzes the bit 3 and bit 121 of the received T.38 DIS to thereby understand that the other communication party to which the IP-FAX machine 1002 is to transmit an image is an analog facsimile machine connected to the T.38 gateway.

The IP-FAX machine 1002 sends a T.38 DCS to the T.38 gateway 1005 (step S4008). The T.38 DCS is converted to a T.30 DCS by the T.38 gateway 1005, and the T.30 DCS is sent to the analog facsimile machine 1006 (step S4009).

The IP-FAX machine 1002 sends a T.38 TCF to the T.38 gateway 1005 (step S4010). The T.38 TCF is converted to a T.30 TCF by the T.38 gateway 1005, and the T.30 TCF is sent to the analog facsimile machine 1006 (step S4011).

Then, the analog facsimile machine 1006 sends a T.30 CFR to the T.38 gateway 1005 (step S4012), and the T.38 gateway 1005 converts the T.30 CFR to a T.38 CFR and sends the T.38 CFR to the IP-FAX machine 1002 (step S4013).

Then, the IP-FAX machine 1002 sends a T.38 image to the T.38 gateway 1005 (step S4014). The T.38 image is converted to a T.30 image by the T.38 gateway 1005, and the T.30 image is sent to the analog facsimile machine 1006 (step S4015).

Thereafter, the session is disconnected (step S4016). Specifically, the IP-FAX machine 1002 issues a SIP BYE signal, and the T.38 gateway 1005 having received the SIP BYE signal releases the line connected to the analog facsimile machine 1006.

Since SIP and the T.38 gateway are based on the known technique, description thereof is omitted. A sequence of image transmission from the analog facsimile machine 1006 to the IP-FAX machine 1002 is basically the same except that the T.38 gateway performs conversion reverse to the above.

In this case, the IP-FAX machine 1002 receives the T.38 DCS from the T.38 gateway. The IP-FAX machine 1002 analyzes the bit 3 and bit 121 of the received T.38 DCS to thereby understand that the other communication party to which the IP-FAX machine 1002 is to transmit an image is an analog facsimile machine 1006 connected to the T.38 gateway 1005.

Figure 5:
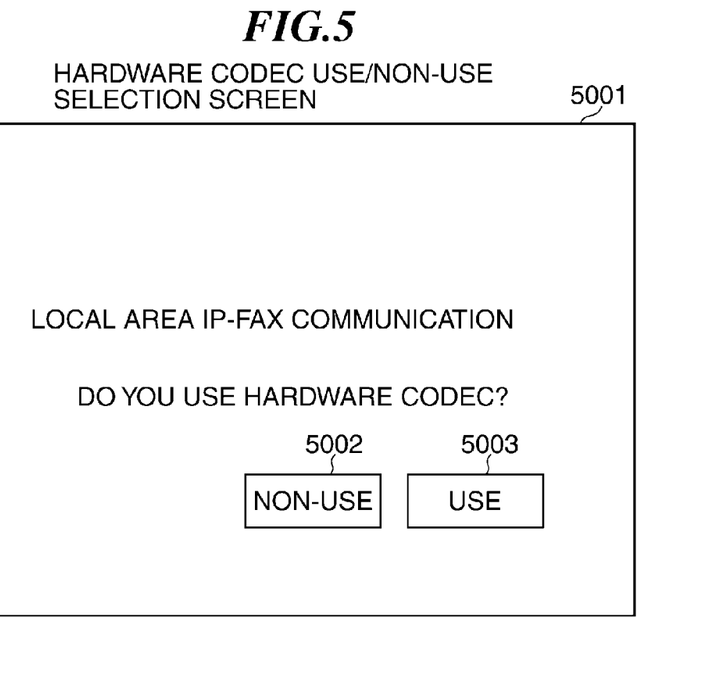
FIG. 5 is a view of an example of a hardware codec use/non-use selection screen displayed on a console section appearing in FIG. 2.

FIG. 5 is a view of an example of a hardware codec use/non-use selection screen displayed on the console section 2002 appearing in FIG. 2.

By using this screen, the user can set whether or not to use the hardware codec 2010 for image encoding and decoding during communication in the local area IP network 1001, which is performed between IP-FAX machines, e.g. for image transmission and reception between the IP-FAX machines 1002 and 1007.

On the hardware codec use/non-use selection screen, denote by reference numeral 5001, there are displayed a "non-use" button 5002 and a "use" button 5003. A setting configured on this screen is stored in the NVRAM 2009, appearing in FIG. 2, so as not to be erased even after the power of the IP-FAX machine is turned off.

Figure 6:
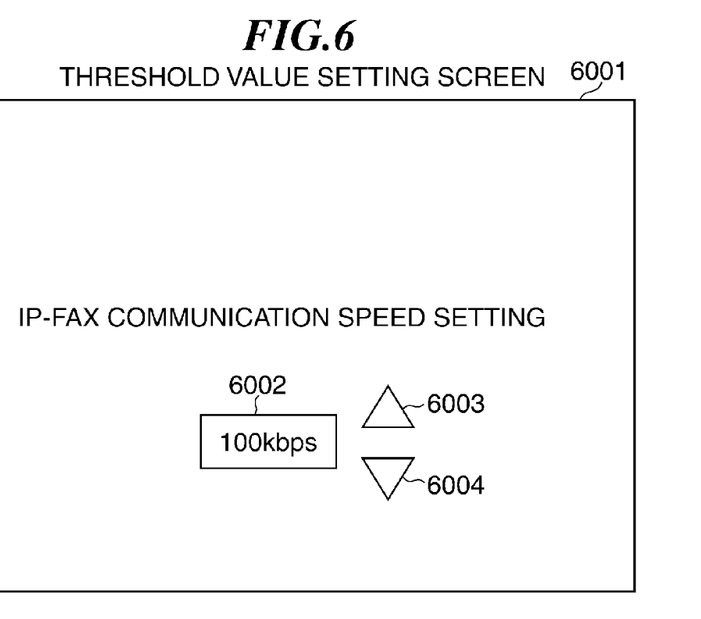
FIG. 6 is a view of an example of a screen displayed on the console section appearing in FIG. 2, for setting a communication speed threshold value for communication using a hardware codec.

FIG. 6 is a view of an example of a screen displayed on the console section 2002 appearing in FIG. 2, for setting a communication speed threshold value for communication using a hardware codec 2010.

When the actual communication speed is higher than a threshold value set by the user on the present screen, image encoding and decoding is performed using the hardware codec 2010, whereas when the actual communication speed is lower than the threshold value, image encoding and decoding is performed using the software codec.

For example, in a case where SIP (Session Initiation Protocol) is used for session connection, the actual communication speed is determined by referring to an SDP (Session Description Protocol) message used to make the session connection by SIP. By analyzing bandwidth information "b=" or a bit rate described in attribute information "a=" in the SDP message, it is possible to determine the communication speed.

On the threshold value setting screen, denoted by reference numeral 6001, there are displayed a threshold value 6002, a button 6003 for increasing the threshold value, and a button 6004 for reducing the threshold value. In the present example, it is possible to perform adjustment in units of 1 kbps. A setting configured on this screen is stored in the NVRAM 2009, appearing in FIG. 2, so as not to be erased even after the power of the IP-FAX machine is turned off.

Figure 7A:
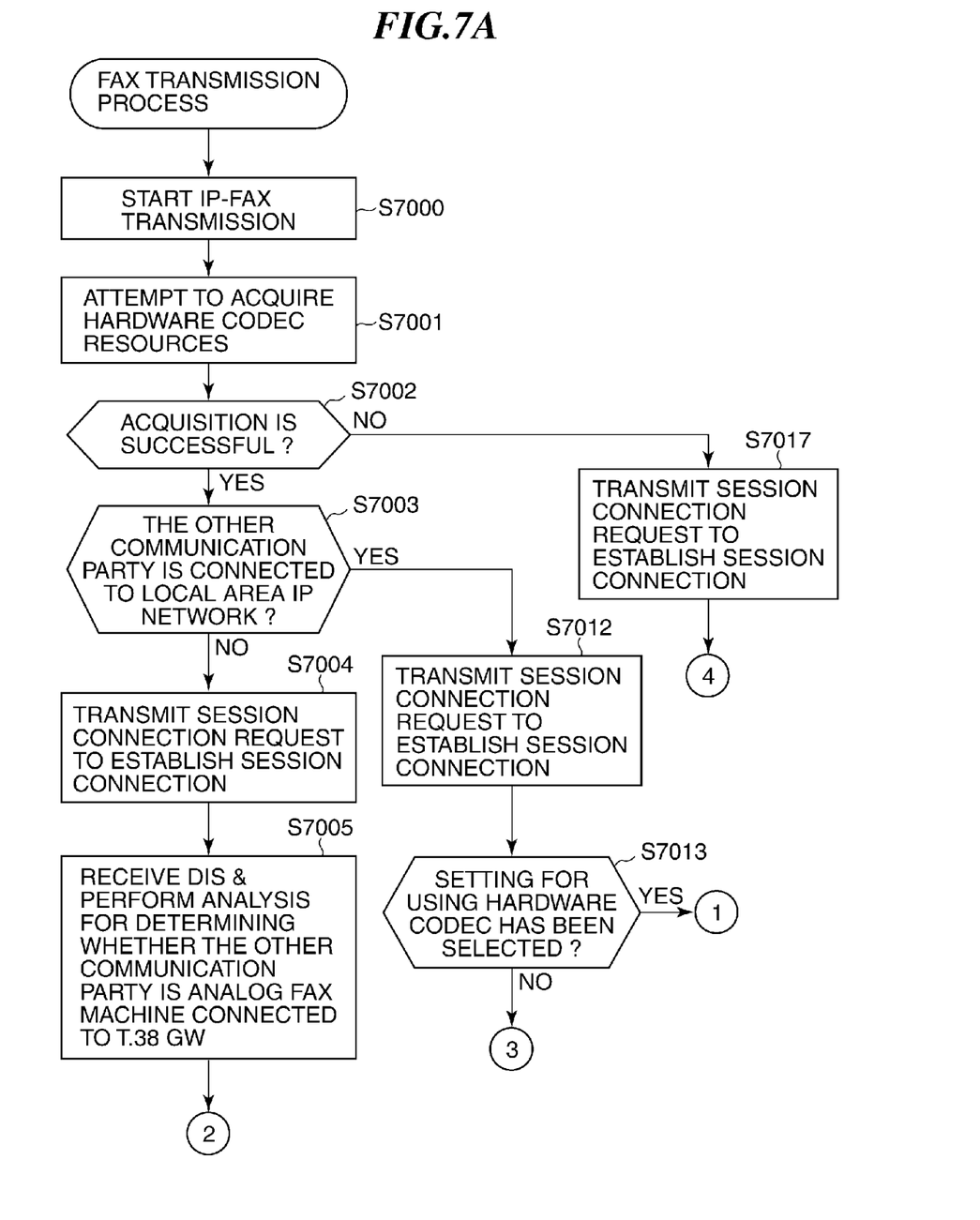
FIGS. 7A and 7B are a flowchart of a facsimile transmission process executed by a CPU of an IP-FAX machine.
Figure 7B:
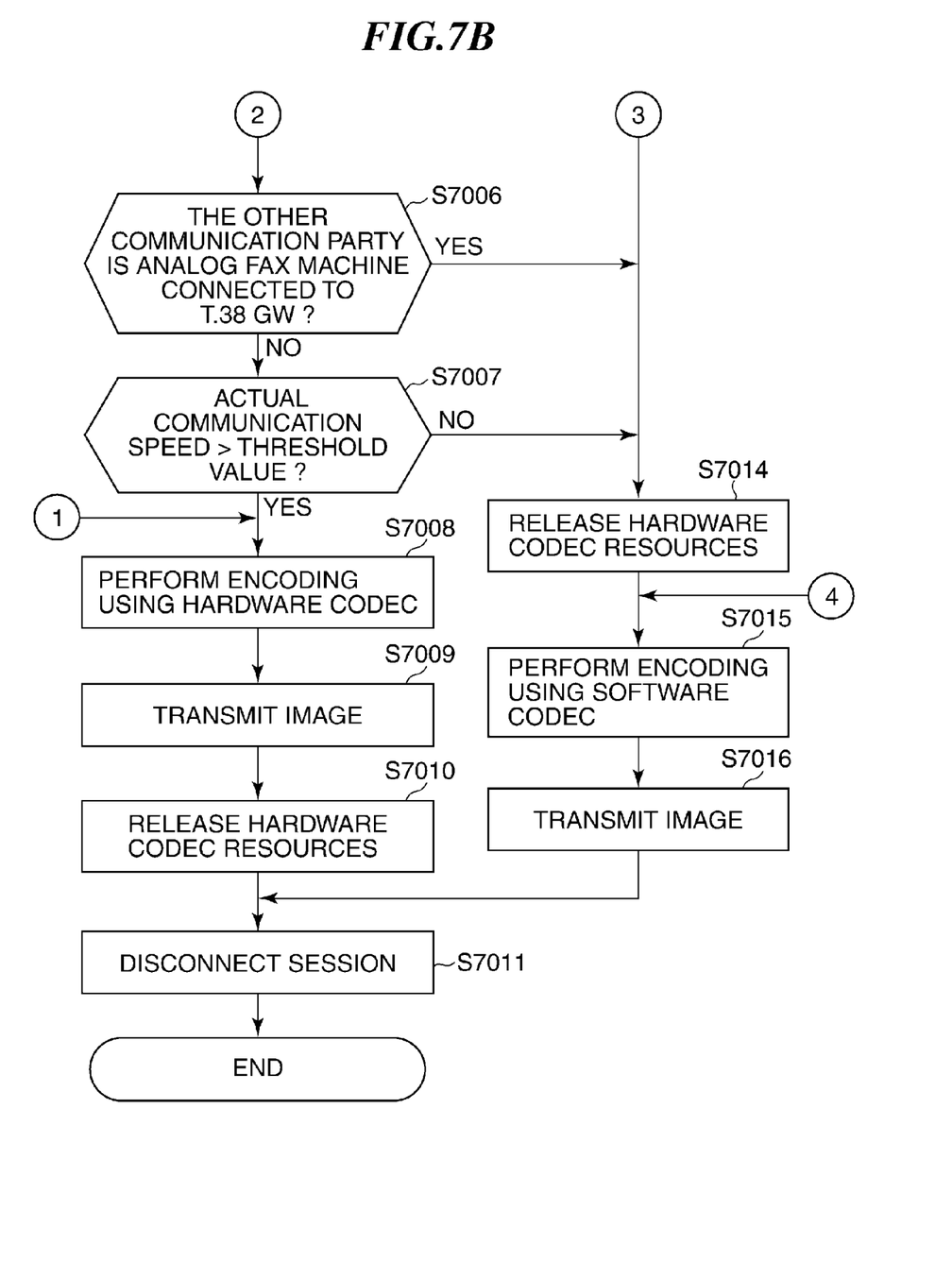

FIGS. 7A and 7B are a flowchart of a facsimile transmission process executed by the CPU 2004 of the IP-FAX machine 1002.

The facsimile transmission process in FIGS. 7A and 7B is applied to a case where the IP-FAX machine 1002 communicates with any of the IP-FAX machine 1004, the analog facsimile machine 1006 connected to the T.38 gateway, and the IP-FAX machine 1007.

Referring to FIGS. 7A and 7B, first, IP-FAX transmission is started by the user (step S7000). Then, the IP-FAX machine 1002 attempts to acquire resources of the hardware codec 2010 (step S7001). This is because one or more hardware codecs exist in the IP-FAX, and hence the step S7001 is executed to declare the use of one of them.

For example, it is assumed that the IP-FAX machine 1002 has only one hardware codec 2010. In the first session, it is possible to acquire the hardware codec resources. However, when facsimile communication by the next session connection is started before completion of the facsimile communication by the first session connection, the only one hardware codec 2010 is in current use, so that it is impossible to acquire the resources of the hardware codec 2010.

The resources of the hardware codec 2010 are released upon completion of a facsimile communication, and only thereafter, it is possible to acquire the resources.

Next, the IP-FAX machine 1002 determines whether or not acquisition of the resources of the hardware codec 2010 is successful (step S7002). If it is determined in the step S7002 that acquisition of the resources of the hardware codec 2010 is successful (YES to the step S7002), the IP-FAX machine 1002 determines whether or not the other communication party is connected to the local area IP network 1001 (step S7003). In the case shown in FIG. 1, it is determined whether or not the other communication party is the IP-FAX machine 1007.

The discrimination as to the other communication party can be performed based on the first numeral of a telephone number assigned to the other communication party. For example, when the telephone number of the other communication party starts with 0, it is determined that the other communication party is connected to the public network, whereas when the telephone number does not start with 0, it is determined that the other communication party is connected to the local area network. Alternatively, whether the other communication party is connected to the local area IP network 1001 or the public IP network 1003 may be described in an address book registered in the IP-FAX machine 1002. In this case, it is possible to discriminate the other communication party by referring to the address book.

If the other communication party is not connected to the local area IP network 1001 (NO to the step S7003), a session is established by transmitting a session connection request (step S7004). In the case of SIP, an INVITE signal is transmitted.

Then, when a DIS is received from the other communication party, the IP-FAX machine 1002 analyzes whether or not the other communication party is an analog facsimile machine connected to the T.38 gateway 1005 (step S7005). Then, the IP-FAX machine 1002 determines, based on the result of the analysis, whether or not the other communication party is an analog facsimile machine (step S7006).

If it is determined in the step S7006 that the other communication party is not an analog facsimile machine (NO to the step S7006), the IP-FAX machine 1002 determines whether or not the IP-FAX communication speed threshold value described with reference to FIG. 6 is below an actual communication speed (step S7007).

If it is determined in the step S7007 that the IP-FAX communication speed threshold value is below the actual communication speed (YES to the step S7007), the IP-FAX machine 1002 performs encoding of a transmitting image using the hardware codec 2010 (step S7008).

Then, the IP-FAX machine 1002 sends the encoded image to the IP-FAX machine 1004 connected to the public IP network 1003 (step S7009). When the image transmission is completed, the IP-FAX machine 1002 releases the resources of the hardware codec 2010 (step S7010) and then disconnects the session (step S7011), followed by terminating the present process.

If it is determined in the step S7002 that acquisition of the resources of the hardware codec 2010 is not successful (NO to the step S7002), the IP-FAX machine 1002 sends a session connection request to the other communication party to establish a session (step S7017), and then the process proceeds to a step S7015.

If it is determined in the step S7003 that the other communication party is connected to the local area IP network 1001 (YES to the step S7003), the IP-FAX machine 1002 sends a session connection request to the IP-FAX machine 1007 connected to the local area IP network 1001, to establish a session (step S7012).

Then, the IP-FAX machine 1002 determines whether or not there has been selected the setting for using the hardware codec 2010 for image encoding and decoding during communication in the local area IP network 1001, as described with reference to FIG. 5 (step S7013). If it is determined in the step S7013 that the setting for using the hardware codec 2010 has been selected (YES to the step S7013), the process proceeds to the step S7008.

On the other hand, if it is determined that the setting for using the hardware codec 2010 has not been selected (NO to the step S7013), the IP-FAX machine 1002 immediately releases the resources of the hardware codec 2010 (step S7014). Thus, the resources of the hardware codec 2010 are released before image transmission, whereby even in a case where IP-FAX simultaneous communication is performed in multi-session, it is possible to use the resources of the hardware codec 2010 without waste.

Then, the IP-FAX machine 1002 performs encoding of the transmitting image using the software codec (step S7008) and sends the encoded image to the other communication party, and then the process proceeds to the step S7011.

If it is determined in the step S7006 that the other communication party is an analog facsimile machine (YES to the step S7006), the process proceeds to the step S7014. Further, if it is determined in the step S7007 that the IP-FAX communication speed threshold value is not below the actual communication speed (NO to the step S7007), the process proceeds to the step S7014.

Figure 8A:
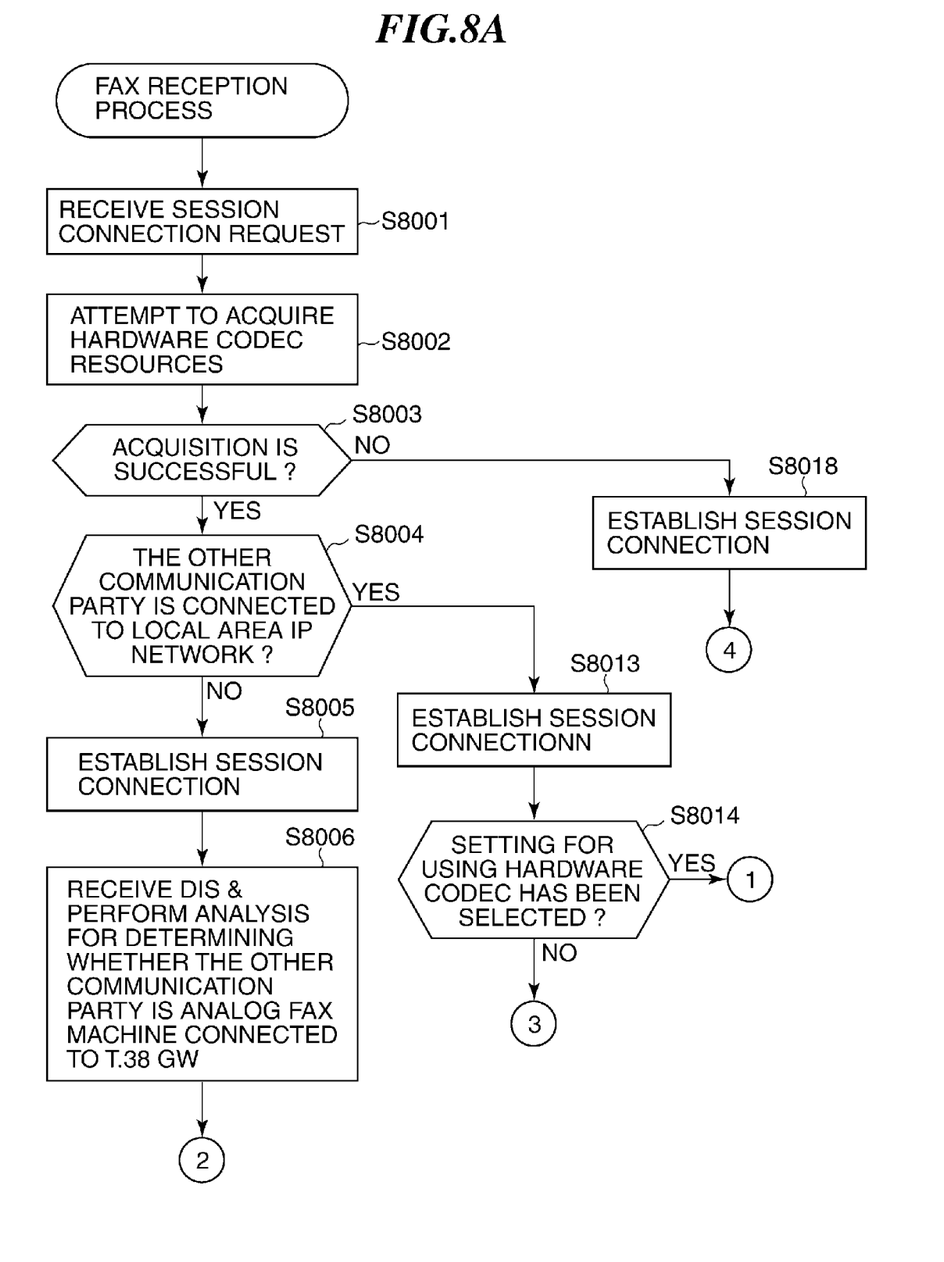
FIGS. 8A and 8B are a flowchart of a facsimile reception process executed by the CPU of an IP-FAX machine.
Figure 8B:
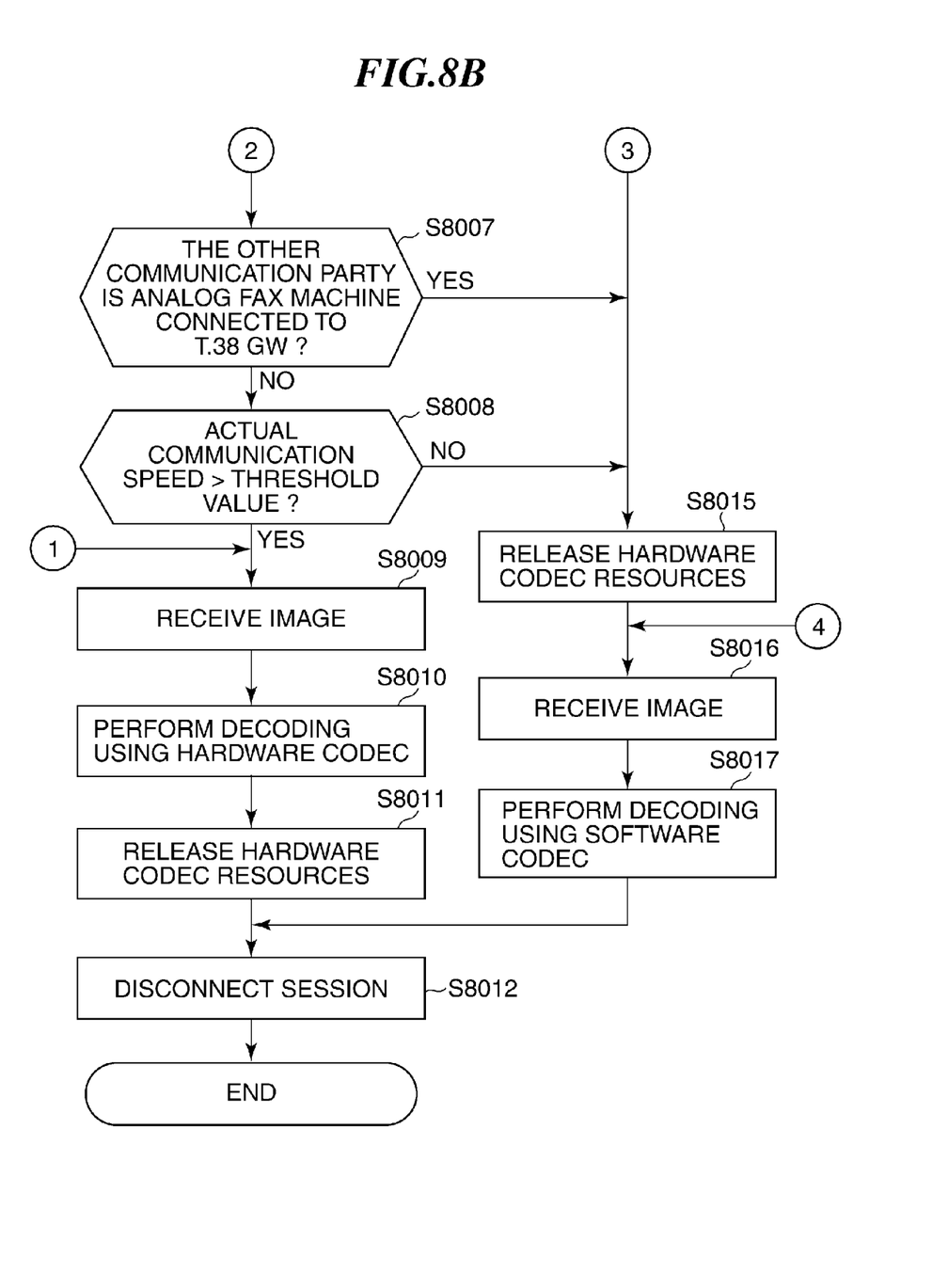

FIGS. 8A and 8B are a flowchart of a facsimile reception process executed by the CPU 2004 of the IP-FAX machine 1002.

The facsimile reception process in FIGS. 8A and 8B is also applied to a case where the IP-FAX machine 1002 communicates with the analog facsimile machine 1006 connected to the T.38 gateway or with the IP-FAX machine 1007.

Referring to FIGS. 8A and 8B, the IP-FAX machine 1002 receives a session connection request from the other communication party (step S8001). More specifically, the IP-FAX machine 1002 receives a SIP INVITE message.

Then, the IP-FAX machine 1002 attempts to acquire the resources of the hardware codec 2010 (step S8002). Thereafter, the IP-FAX machine 1002 determines whether or not acquisition of the resources of the hardware codec 2010 is successful (step S8003). If acquisition of the resources of the hardware codec 2010 is successful (YES to the step S8003), the IP-FAX machine 1002 determines whether or not the other communication party is connected to the local area IP network 1001 (step S8004). In the case shown in FIG. 1, it is determined whether or not the other communication party is an IP-FAX machine.

For example, in a case where SIP is used for session connection, the other communication party can be discriminated by referring to a SDP message used for the session connection. In this case, medium information "m=" is analyzed, and if m=application, it is determined that the other communication party is connected to the public IP network 1003, whereas if m=image, it is determined that the other communication party is connected to the local area IP network 1001. Alternatively, the domain name of the URI of the other communication party may be referred to. Further, whether the other communication party is connected to the local area IP network 1001 or the public IP network 1003 may be described in the address book registered in the IP-FAX machine 1002.

If it is determined in the step S8004 that the other communication party is not connected to the local area IP network 1001 (NO to the step S8004), a session connection request is transmitted, whereby a session is established (step S8005).

Then, when a DIS is received from the other communication party, the IP-FAX machine 1002 performs analysis for determining whether or not the other communication party is an analog facsimile machine connected to the T.38 gateway 1005 (step S8006). Then, the IP-FAX machine 1002 determines, based on the result of the analysis, whether or not the other communication party is an analog facsimile machine (step S8007).

If the other communication party is not an analog facsimile machine 1006 (NO to the step S8007), the IP-FAX machine 1002 determines whether or not the IP-FAX communication speed threshold value described with reference to FIG. 6 is below an actual communication speed (step S8008).

If it is determined in the step S8008 that the IP-FAX communication speed threshold value is below the actual communication speed (YES to the step S8008), an image is received (step S8009). Then, decoding of the received image is performed using the hardware codec 2010 (step S8010). When the decoding is completed, the IP-FAX machine 1002 releases the resources of the hardware codec 2010 (step S8011) and then disconnects the session (step S8012), followed by terminating the present process.

If it is determined in the step S8003 that acquisition of the resources of the hardware codec 2010 is not successful (NO to the step S8003), the IP-FAX machine 1002 sends a session connection request to the other communication party to establish a session (step S8018), and then the process proceeds to a step S8016.

If it is determined in the step S8004 that the other communication party is connected to the local area IP network 1001 (YES to the step S8004), the IP-FAX machine 1002 sends a session connection request to the IP-FAX machine 1007 connected to the local area IP network 1001, to establish a session (step S8013).

Then, the IP-FAX machine 1002 determines whether or not there has been selected the setting for using the hardware codec 2010 for image encoding and decoding during communication in the local area IP network 1001, as described with reference to FIG. 5 (step S8014). If it is determined in the step S8014 that the setting for using the hardware codec 2010 has been selected (YES to the step S8014), the process proceeds to the step S8009.

On the other hand, if the setting for using the hardware codec 2010 has not been selected (NO to the step S8014), the IP-FAX machine 1002 immediately releases the resources of the hardware codec 2010 (step S8015).

Then, the IP-FAX machine 1002 receives an image (step S8016) and performs decoding of the received image using the software codec (step S8017), and then the process proceeds to the step S8012.

If it is determined in the step S8007 that the other communication party is an analog facsimile machine (YES to the step S8007), the process proceeds to the step S8015. Further, if it is determined in the step S8008 that the IP-FAX communication speed threshold value is not below the actual communication speed (NO to the step S8008), the process proceeds to the step S8015.

The step S7009 in FIG. 7B and the step S8009 in FIG. 8B correspond to an operation of a transmission and reception unit configured to be capable of transmitting and receiving the image using lines different in communication speed. Further, the step S7008 in FIG. 7B and the step S8010 in FIG. 8B correspond to operations of a control unit. More specifically, in these steps, control is performed such that when an image is to be transmitted or received using a line with higher communication speed, the hardware codec is used to encode or decode an image. Operations of the step S7015 in FIG. 7B and the step S8017 in FIG. 8B also correspond to the control unit. More specifically, in these steps, control is performed such that when an image is to be transmitted or received using a line with lower communication speed, the software codec is used to encode or decode an image.

Further, in FIGS. 7A and 7B and 8A and 8B, control is performed such that when a line that is not charged for image transmission or reception (i.e. the local area IP network) is used, the software codec is used to encode or decode an image. Furthermore, in FIGS. 7A and 7B and 8A and 8B, when the communication speed exceeds the preset threshold value, the hardware codec is used to encode or decode an image, whereas when the communication speed is below the preset threshold value, the software codec is used to encode or decode the image.

According to the above-described embodiment, in a case where charging occurs e.g. for communication between IP-FAX machines on a high-speed network, such as the public IP network, it is possible to use the high-speed hardware codec.

On the other hand, in a low-speed communication e.g. with an analog facsimile machine connected to the T.38 gateway on the public IP network, the low-speed software codec is used.

Further, the software codec is used for a high-speed but uncharged communication e.g. on the local area IP network, whereby high-speed communication between IP-FAX machines on the public IP network, which is to be charged, can be performed through another line.

According to the processes in FIGS. 7 and 8, control is performed such that when an image is to be transmitted or received through a line with high communication speed, the hardware codec is used to encode or decode the image, whereas when an image is to be transmitted or received through a line with low communication speed, the software codec is used to encode or decode the image. This enables a communication apparatus, which is capable of using codecs different in speed for encoding or decoding an image to be transmitted or received by facsimile communication, to selectively use the codecs appropriately.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2011-183865 filed Aug. 25, 2011, which is hereby incorporated by reference herein in its entirety.

What is claimed is:

1. A communication apparatus comprising:
a first codec unit configured to encode and decode images;
a second codec unit configured to encode and decode images at higher speed than said first codec unit; and
a control unit configured to cause said second codec unit to encode or decode an image in a case where the communication apparatus performs facsimile communication with a facsimile machine connected to an IP network, and cause said first codec unit to encode or decode the image in a case where the communication apparatus performs facsimile communication with a facsimile machine connected to an analog network.

2. The communication apparatus according to claim 1, wherein even in a case where the communication apparatus performs facsimile communication with the facsimile machine connected to the IP network, on condition that the facsimile communication is not charged, said control unit causes said first codec unit to encode or decode the image.

3. The communication apparatus according to claim 1, wherein even in a case where the communication apparatus performs facsimile communication with the facsimile machine connected to the IP network, on condition that communication speed does not exceed a preset threshold value, said control unit causes said first codec unit to encode or decode the image.

4. The communication apparatus according to claim 3, further comprising a display unit configured to display a configuration screen for setting the threshold value.

5. The communication apparatus according to claim 1, wherein even in a case where the communication apparatus performs facsimile communication with the facsimile machine connected to the IP network, on condition that said second codec unit is not available, said control unit causes said first codec unit to encode or decode the image.

6. The communication apparatus according to claim 5, wherein it is determined that said second codec unit is not available when said second codec unit is being used for another facsimile communication.

7. The communication apparatus according to claim 1, wherein said first codec unit is a software codec, and said second codec unit is a hardware codec.

8. A method of controlling a communication apparatus including a first codec unit configured to encode and decode images and a second codec unit configured to encode and decode images at higher speed than said first codec unit, comprising:
causing the second codec unit to encode or decode an image in a case where the communication apparatus performs facsimile communication with a facsimile machine connected to an IP network; and
causing the first codec unit to encode or decode the image in a case where the communication apparatus performs facsimile communication with a facsimile machine connected to an analog network.

9. A non-transitory computer-readable storage medium storing a computer-executable program for causing a computer to execute a method of controlling a communication apparatus including a first codec unit configured to encode and decode images and a second codec unit configured to encode and decode images at higher speed than said first codec unit,
wherein the method comprises:
causing the second codec unit to encode or decode an image in a case where the communication apparatus performs facsimile communication with a facsimile machine connected to an IP network; and
causing the first codec unit to encode or decode the image in a case where the communication apparatus performs facsimile communication with a facsimile machine connected to an analog network.

10. A communication apparatus comprising:
a first codec unit configured to encode and decode images;
a second codec unit configured to encode and decode images at higher speed than said first codec unit; and
a control unit configured to cause said first codec unit to encode or decode an image in a case where the communication apparatus performs facsimile communication with a facsimile machine connected to an IP network and communication speed of the facsimile communication does not exceed a threshold value, and to cause said second codec unit to encode or decode the image in a case where the communication apparatus performs facsimile communication with the facsimile machine connected to the IP network and the communication speed of the facsimile communication exceeds the threshold value.

11. A communication apparatus according to claim 10, further comprising a receiving unit configured to receive, from a user, the threshold value.

* * * * *